Figure 1:
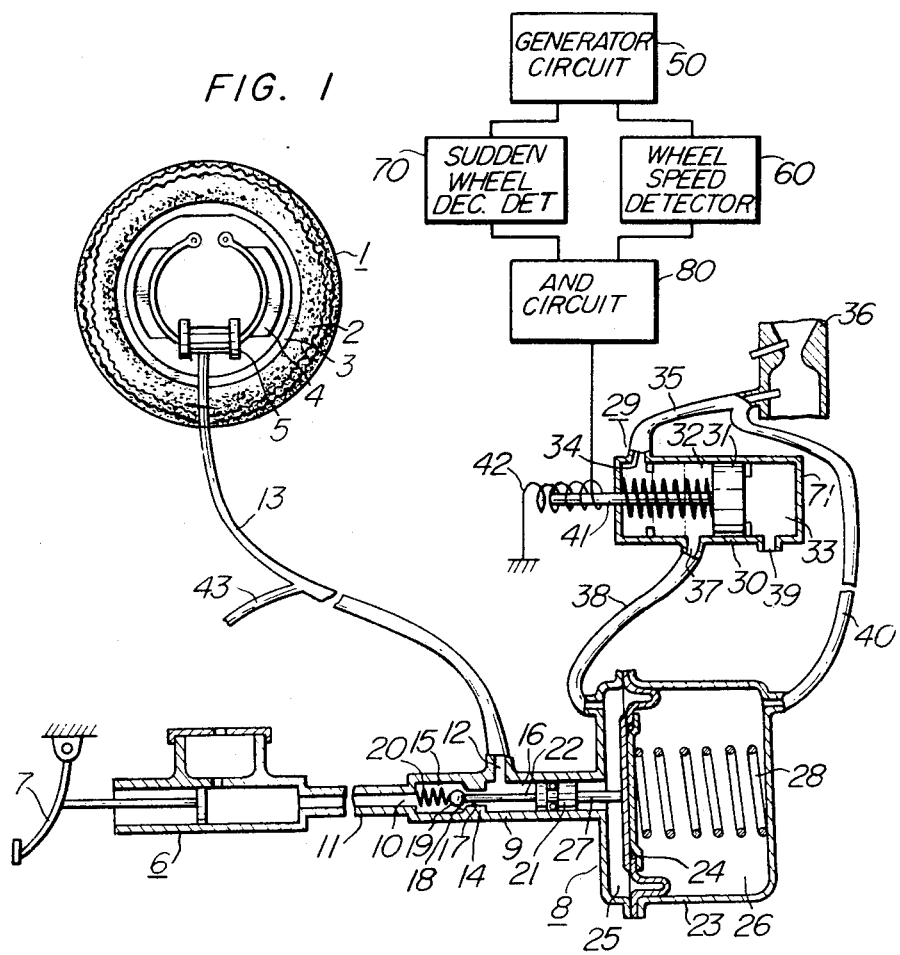

United States Patent [15] 3,640,589
Taniguchi [45] Feb. 8, 1972

[54] AUTOMATIC ANTISKID BRAKING SYSTEM

[72] Inventor: Koichi Taniguchi, Kariya-shi, Japan
[73] Assignee: Nippondenso Kabushiki Kaisha, Kariya-shi, Japan
[22] Filed: Dec. 30, 1969
[21] Appl. No.: 889,065

[52] U.S. Cl. .........................303/21 BE, 188/181 R, 303/20, 303/21 F
[51] Int. Cl. ..........................................B60t 8/08, B60t 8/12
[58] Field of Search...............188/181; 303/21, 20; 307/121; 324/162; 328/146; 340/262

[56] References Cited

UNITED STATES PATENTS

| | | | |
|---|---|---|---|
| 3,494,671 | 2/1970 | Slavin et al. | 303/21 P |
| 3,507,544 | 4/1970 | Wakamatsu et al. | 303/21 CG |
| 3,520,575 | 7/1970 | Steigerwald | 303/21 EB |
| 3,524,685 | 8/1970 | Harned et al. | 303/21 P |

Primary Examiner—Trygve M. Blix
Assistant Examiner—Stephen G. Kunin
Attorney—Cushman, Darby & Cushman

[57] ABSTRACT

An automatic antiskid braking system including a sudden wheel deceleration detector for detecting a sudden deceleration of the wheels and which emits a first signal upon detecting sudden deceleration and then maintains this first signal for a certain period of time even after the wheels have stopped rotating, a wheel speed detector for detecting the wheel speed being below a predetermined value for emitting a second signal in response thereto, an AND circuit emitting a third signal when the first and second signals from both the sudden wheel deceleration detector and the wheel speed detector are impressed thereon, and a pressure regulating mechanism for relieving brake pressure in response to the third signal from the AND circuit. A vehicle provided with such system can be stopped or decelerated within the shortest possible distance of travel on a good and relatively nonslippery road surface, while the vehicle can still be stopped and decelerated without encountering a skid condition on a slippery road surface.

3 Claims, 2 Drawing Figures

AUTOMATIC ANTISKID BRAKING SYSTEM

The present invention relates to an automatic antiskid braking system for automotive vehicles and the like, which is so designed that when brakes are applied to the vehicle a braking force optimum to the weight of the vehicle and road conditions on which the vehicle is moving can automatically be obtained to avoid locking of the wheels.

Conventional automatic antiskid braking systems of the type described are broadly classified into (a) a type wherein oil pressure (or air pressure) is maintained below a predetermined level, (b) a type wherein oil pressure (or air pressure) is regulated according to the deceleration of the wheel peripheral speed upon detecting such speed, and (c) a type wherein the braking force is regulated according to the weight of the vehicle. The common defects of these prior art systems are that they are not adaptable to the condition of the surface on which the vehicle is travelling and that the state of the wheels being locked and skidding cannot be detected. As a result, there is the disadvantage that when the condition of the surface on which the vehicle is travelling is good and therefore it is relatively hard to skid thereon, the braking force is unduly decreased to make the braking distance unnecessarily long. Or, conversely, when the condition of the surface is slippery tending to cause skidding of the wheels, the braking force is not decreased, though it should be, and the wheels skid on the surface, causing a dangerous condition.

There is also provided a system wherein the deceleration of the vehicle body is derived in the form of a signal by mechanically or electrically detecting the movement upon application of brakes, of a weight which is pivotally connected at one end to the vehicle body so as to be swingable only in a longitudinal direction of the vehicle, while the deceleration of the wheel peripheral speed is also derived in the form of a signal, and the brake pressure is controlled when the signal representative of the wheel peripheral speed deceleration becomes greater than the signal representative of the vehicle body deceleration after the latter has reached a predetermined value.

However, this prior art system also has the same defects as those possessed by the prior art systems mentioned earlier. In addition, to detecting the vehicle body deceleration by means of the movement of the weight on application of brakes, the influence of the force of gravity cannot be ignored, and hence the true deceleration of the vehicle body cannot be detected. The practical value of this prior art system is particularly diminished when the vehicle travels on an incline or decline. Because when the vehicle is travelling upon an incline, the detected deceleration of the vehicle body is only the balance of the true while deceleration and the effects of gravity, so that while the true deceleration of the vehicle body has already reached the predetermined value, a signal to lower the brake pressure is not emitted, with the result that the wheels are locked and skid on the road surface. Thus, the purpose of preventing the skid cannot be attained. On the other hand, when the vehicle is moving down a decline, the vehicle body deceleration detected is the sum of the true deceleration and the gravity, so that a signal to lower the brake pressure is emitted in spite of the fact that the true vehicle body deceleration has not yet reached the predetermined value, and the braking distance becomes extremely long when it is desired to stop the vehicle.

The object of the present invention is to provide an automatic antiskid braking system for automotive vehicles and the like, which comprises a detector for detecting a sudden deceleration of the vehicle wheels and for simultaneously emitting a first signal to relieve the brake pressure and for then maintaining said signal for a time period even after the wheels have stopped rotating, a wheel speed detector for detecting the wheel speed being below a predetermined level and for simultaneously emitting a second signal, an AND-circuit adapted to emit a third signal when the first and second signals from both of said detectors are impressed thereon, and a pressure regulating mechanism for relieving the brake pressure in response to the third signal from said AND-circuit.

According to the present invention, it is possible to detect beforehand the danger of the wheels being locked and thereby to obtain automatically a braking force optimum to the surface condition of the road on which the vehicle is travelling and the weight of the vehicle. Consequently, accidents resulting possibly from skidding can be substantially decreased and a remarkable effect can be expected in shortening the braking distance. Furthermore, unlike the prior art systems which are not capable of sensing whether the wheels have stopped rotating or not, the system of the invention achieves such an excellent effect that a vehicle provided with the system can be decelerated or stopped with the shortest possible braking distance when it is travelling on a surface on which the wheels hardly skid, whereas the vehicle can be decelerated or stopped without skidding when it is travelling on a slippery surface.

It is also to be noted that since in the present invention the brake pressure is controlled by the signals from both of the sudden wheel deceleration detector and the wheel speed detector, and not by a signal representative of the wheel deceleration which is detected with the force of gravity added thereto when the vehicle is travelling on an ascending slope or with the same subtracted therefrom when the vehicle is travelling on a descending slope, an adequate braking force can automatically be obtained at all times, even when the vehicle is moving on an ascending or descending slope.

Figure 2:
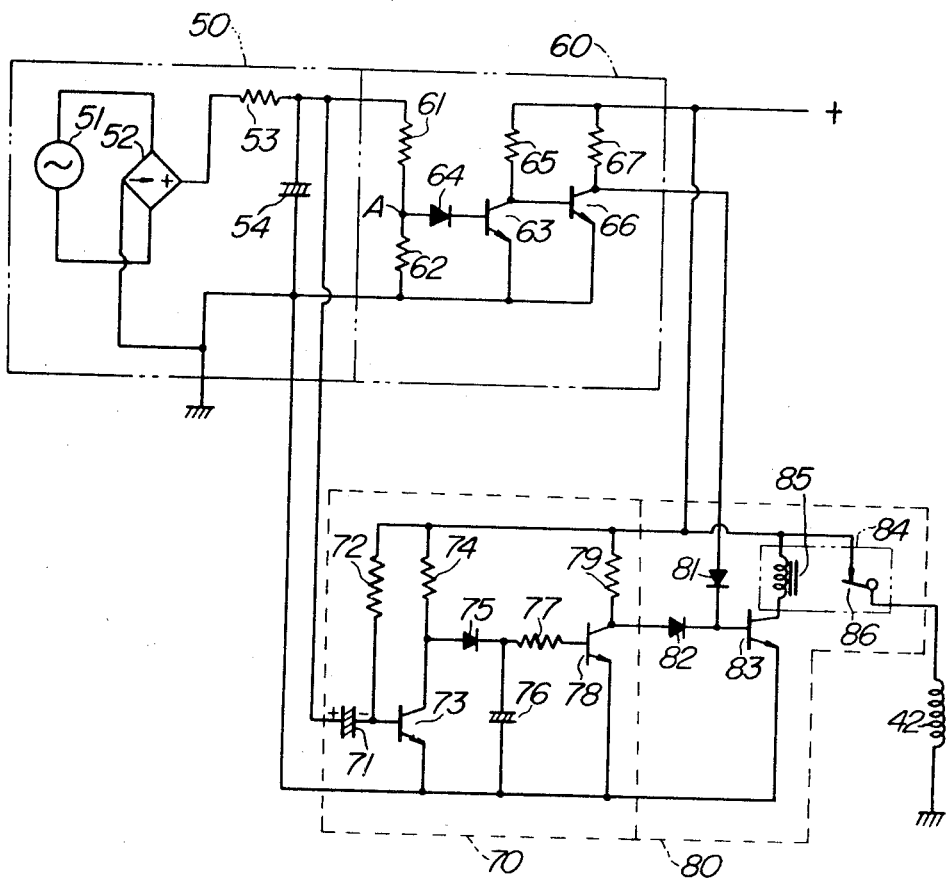

The present invention will appear more clearly from the following detailed description when taken in conjunction with the accompanying drawings, showing by way of example a preferred embodiment of the invention, in which:

FIG. 1 is a fragmentary vertical sectional view diagrammatically showing the overall construction of the automatic antiskid braking system according to the present invention and FIG. 2 is an electric connection diagram showing the electric control means of the system.

Referring to the drawings and particularly to FIG. 1, numeral 1 designates a wheel which is one of a plurality of wheels provided on a vehicle. Numeral 2 designates a tire, 3 a brakedrum and 4 brakeshoes. Numeral 5 designates a wheel cylinder for developing a hydraulic pressure under which said brakeshoes 4 are pressed against said brakedrum 3. Numeral 6 designates a master cylinder for supplying a hydraulic pressure according to the movement of a brake pedal 7. Numeral 8 designates a brake pressure governor constituting the critical part of a pressure-regulating mechanism, 9 a hydraulic cylinder and 10 a hole bored through an end wall of said hydraulic cylinder 9 and communicating with said master cylinder 6 through a conduit 11. Numeral 12 designates a hole bored through the peripheral wall of the hydraulic cylinder 9 and communicating with the wheel cylinder 5 through a conduit 13. Numeral 14 designates a partition wall to divide the interior of the hydraulic cylinder 9 into two chambers 15, 16 which are communicated with each other through an axial hole 17 bored through said partition wall. The holes 10 and 12 are communicated with each other through the axial hole 17 in the partition wall 14. Numeral 18 designates a valve seat formed around the opening of the hole 17 which is open in the chamber 15. Numeral 19 designates a ball valve disposed within the chamber 15. Numeral 20 designates a spring by which the ball valve 19 is held seated on the valve seat 18. Numeral 21 designates a hydraulic piston slidably mounted in the chamber 16 and numeral 22 designates a plunger connected to one end of said piston 21, with the free end extremity thereof slidably extending through the hole 17 and abutting against the ball valve 19. Numeral 23 designates a power cylinder coaxially connected to the hydraulic cylinder 9 integrally therewith. Numeral 24 designates a diaphragm by which the interior of the power cylinder 23 is divided into two chambers 25, 26. Numeral 27 designates an operating rod having one end fixed to the central portion of the diaphragm 24 and the other end in abutting engagement with the hydraulic piston 21. Numeral 28 designates a spring provided within the chamber 26. Numeral 29 generally designates a three-way solenoid valve means comprising a cylinder 30 and a piston 31 slidably mounted in said cylinder to divide the interior of the cylinder into two chambers 32, 33. The chamber 32 communicates with an intake pipe 36 of the engine mounted on the vehicle through a conduit 35, and also communicates with the chamber 25 in the power cylinder 23 through a port 37 and a conduit 38. The other chamber 33 is open to the atmosphere through a port 39. The chamber 26 in the power cylinder 23 communicates with the intake pipe 36 through a conduit 40. Numeral 41 designates an operating rod of a magnetic material connected to the piston 31, and numeral 42 designates a solenoid wound around said operating rod 41. The arrangement is such that when the solenoid 42 is energized, the operating rod 41 is moved by the magnetic attraction of said solenoid, whereby the piston 31 is displaced to the position indicated by the two-dotted chain line to interrupt the communication between the ports 34 and 37, while establishing communication between the ports 37 and 39. Numeral 43 designates a conduit through which the hydraulic pressure is supplied from the master cylinder 6 to the other wheel cylinder (not shown). The brake pressure governor means 8 and the three-way solenoid valve means 29 together constitute a pressure regulating mechanism. Numeral 50 generally designates a generator circuit which generates a direct-current voltage corresponding to the wheel speed. Numeral 60 generally designates a wheel speed detector which will emit a second signal under the output voltage of said generator circuit 50 when the wheel speed drops below a predetermined value, e.g., 20 km./h. Numeral 70 generally designates a sudden wheel deceleration detector which will emit under the output voltage of the generator circuit 50 a first signal to relieve the brake pressure upon detecting a sudden deceleration of the wheel 1, and maintain the signal for a certain period, e.g., 0.3 second, even after the wheel 1 has stopped rotating. Numeral 80 generally designates an AND-circuit which will emit a third signal when the first and second signals from both of the wheel speed detector 60 and the sudden wheel deceleration detector 70 are impressed thereon, to energize the solenoid 42 of the three-way solenoid valve means 29.

Now, the electric circuits of the generator circuit 50, the wheel speed detector 60, the sudden wheel deceleration detector 70 and the AND-circuit will be explained with reference to FIG. 2. Referring first to the generator circuit 50, numeral 51 designates an AC generator driven from the propeller shaft of the vehicle to detect the rotational speed of the wheels, particularly of the rear wheels, from the rotation of the propeller shaft, and numeral 52 designates a rectifier circuit consisting of a bridge circuit of diodes, by which the output alternating-current voltage of said AC generator 51 is rectified. Numeral 53 designates a smoothing resistor and numeral 54 designates a smoothing capacitor. A direct-current voltage corresponding to the wheel speed appears across the opposite terminals of the capacitor 54. In the wheel speed detector 60, numerals 61, 62 designate resistors to divide the direct-current voltage developed across the terminals of the capacitor 54. Numeral 63 designates a transistor which is energized by a voltage developed at the voltage dividing point A of the resistors 61, 62, which is impressed on the base thereof through a diode 64. The voltage dividing ratio of the resistors 61 and 62 is so selected that the sum of the base-emitter forward voltage drop of the transistor 63 and the forward voltage drop of the diode 64 (about 1.4 v. when both of the transistor 63 and the diode 64 consist of a silicon semiconductor) will correspond to the wheel speed to be detected, e.g., 20 km./h. The transistor 63 is energized when the voltage at the dividing point A is higher than 1.4 v., and is deenergized when the former is lower than the latter. In other words, the transistor 63 is energized when the wheel speed is higher than the predetermined value of 20 km./h., and it is deenergized when the former is lower than the latter. Numeral 65 designates a load resistance connected to the collector of the transistor 63; 66 a phase inverting transistor and 67 a load resistance connected to the collector of the transistor 66. Turning now to the sudden wheel deceleration detector 70, numerals 71, 72 designate a capacitor and a resistor respectively which compose a differentiation circuit; 73 a transistor to be energized or deenergized under the output of said differentiation circuit; 74 a collector load resistance of said transistor 73; 75 a diode; 76 a capacitor and 77 a resistor. Numeral 78 designates an amplifying transistor and numeral 79 designates a collector load resistance of said transistor 78. The arrangement is such that when the brake pedal is actuated by the vehicle operator to apply a brake pressure to the wheel 1 and thereby the peripheral speed of the wheel 1 is suddenly decelerated to a predetermined value of 1.0 g. (g. is the acceleration due to gravity), the voltage across the terminals of the capacitor 54 drops sharply, while on the other hand the capacitor 71 is charged, so that the transistor 73 is deenergized and thereby the capacitor 76 is charged through the resistor 74 and the diode 75 and simultaneously the transistor 78 is energized; and further such that the transistor 78 may be held in the energized state for a period, e.g., for about 0.3 second, as determined by the time constants of the capacitor 76 and the resistor 77 even after the wheel deceleration has dropped to a value below 1.0 g. or the wheel 1 has stopped rotating at a peripheral speed deceleration of larger than 1.0 g., with the charge supplied to the base thereof which has previously been stored in the capacitor 76. In other words, the transistor 78 is deenergized when the deceleration of the wheel peripheral speed is below 1.0 g., and is energized when the same is greater than 1.0 g. and held in the energized state for a period of 0.3 second. The term "peripheral speed deceleration of the wheel 1" as used herein means the differential of the wheel peripheral speed V relative to time $t$, i.e., $dV/dt$, because the speed at one point on the periphery of the wheel, that is, the wheel peripheral speed V can be expressed by the formula $V=r\omega$ wherein $r$ is the effective radius of the wheel 1 and $\omega$ is the angular speed of the same. Referring finally to the AND-circuit 80, numerals 81, 82 designate diodes; 83 a transistor and 84 a relay circuit including a relay coil 85 which is connected to the collector of said transistor 83. The arrangement is such that when the transistor 83 is energized to conduct a current through the relay coil 85, a contact 86 is opened, whereas when the current supply to the relay coil 85 is interrupted, the contact 86 is closed. Namely, the transistor 83 of the AND-circuit 80 is deenergized and the contact 86 is closed only after both of the transistor 66 in the wheel speed detector 60 and the transistor 78 in the sudden wheel deceleration detector 70 have been energized. The contact 86 is connected in series with the solenoid 42 of the three-way solenoid valve means 29.

The system of the present invention, constructed as described above, operates in the following manner:

First of all, the operations of the respective parts when the solenoid 42 of the three-way solenoid valve means 29 is not energized will be explained. When the solenoid 42 is in the deenergized state, the piston 31 is in the position indicated by the solid line in FIG. 1, so that the negative pressure in the intake pipe 36 is introduced into the chamber 32 through the conduit 35 and thence into the chamber 25 in the power cylinder 23 of the brake pressure governor means 8. The negative pressure in the intake pipe 36 is also introduced into the chamber 26 in the power cylinder 23 through the conduit 40, and thus the negative pressures in the chambers 25 and 26 are balanced. Therefore, the diaphragm 24 is moved toward the chamber 25 under the biasing force of the spring 28 and the movement of said diaphragm 24 is transmitted to the piston 21 through the operating rod 27, to move in the same direction. The ball valve 19 is unseated from the valve seat 18 by the plunger 22 which pushes said ball valve against the biasing force of the spring 20. The holes 10 and 12 are communicated with each other through the chamber 15, the passage hole 17 and the chamber 16, establishing the communication between the master cylinder 6 and the wheel cylinder 5. The brake pressure developed in the master cylinder 6 is supplied into the wheel cylinder 5 freely to provide for normal braking operation.

Under such conditions, the brake pedal is actuated to operate the master cylinder 6, the wheel cylinder 5 and the brakeshoes 4 to apply a braking force to the wheel 1. When the peripheral speed deceleration of the wheel 1 exceeds 1.0 g., the transistor 73 in the sudden wheel deceleration detector 70 is deenergized and the transistor 78 is energized. If the wheel speed is higher than the predetermined value of 20 km./h. in this case, the transistor 63 in the wheel speed detector 60 is held in the energized state and the transistor 66 in the deenergized state, so that the transistor 83 of the AND-circuit 80 is held in the energized state and hence the relay coil 85 of the relay circuit 84 is also energized, holding the contact 86 in an open position. Therefore, the solenoid 42 of the three-way solenoid valve means 29 is not energized, providing for normal braking operation in the case of the solenoid being not energized, as described previously.

However, when the peripheral speed deceleration of the wheel 1 becomes greater than 1.0 g., with the transistor 78 of the sudden wheel deceleration detector 70 being in the energized state, while the wheel speed is below 20 km./h. and the transistor 66 of the wheel speed detector 60 is energized, the transistor 83 of the AND-circuit 80 is deenergized, so that the current supply to the relay coil 85 is interrupted and the contact 86 is closed. The solenoid 42 of the three-way solenoid valve means 29 is energized and the piston 31 is moved to the position indicated by the two-dotted chain line in FIG. 1. The communication between the ports 34 and 37 is shut down, whereas the communication between the ports 37 and 39 is established. The atmospheric pressure is introduced into the chamber 25 in the power cylinder 23 of the brake pressure governor means 8 through the port 39, the chamber 33, the port 37 and the conduit 38. Since the chamber 26 of the power cylinder 26 is constantly in communication with the intake pipe 36, with the negative pressure present therein, the diaphragm 24 is displaced toward the chamber 26 against the biasing force of the spring 28 and, therefore, the piston 21 is displaced, following the diaphragm, under the brake pressure acting thereon from the wheel cylinder 5, with the result that the plunger 22 is disengaged from the ball valve 19. Consequently, the ball valve 19 seats on the valve seat 18 under the biasing force of the spring 20, to close the passage hole 17. The communication between the master cylinder 6 and the wheel cylinder 5 is interrupted. Further, as a result of displacement of the piston 21 toward the diaphragm 24 as described above, the volume of the chamber 16 is increased and the brake pressure in the wheel cylinder 5 is correspondingly decreased. Thus, the brake pressure applied to the wheel 1 is relieved. By the operation described above, the locking of the wheel 1 is prevented and the rotational speed of the wheel 1 is increased by the torque caused by the reaction of the road surface. At the same time, the transistor 78 of the sudden wheel deceleration detector 70 is deenergized and the transistor 83 of the AND-circuit 80 is energized, whereby the brake pressure is again applied to the wheel 1. Thereafter, the above-described operation is repeated and thereby the vehicle is braked without having the wheels locked.

Such operation similarly takes place when the wheel 1 has stopped rotating, despite energization of the solenoid 42 of the three-way solenoid valve means 29, due to an operation delay of said three-way solenoid valve means 29, the brake pressure governor means 8, etc. Namely, when the wheel 1 is slowed down at a deceleration of 1.0 g. or greater and has stopped due to the aforesaid operation delay, in spite of the fact that the solenoid 42 is energized, the voltage at the voltage dividing point A of the wheel speed detector 60 becomes zero, so that the transistor 63 is deenergized and the transistor 66 is energized. On the other hand, the transistor 78 of the sudden wheel deceleration detector 70, even after stoppage of the wheel 1, is maintained in the energized state for a certain period, e.g., for 0.3 second, as determined by the time constants of the capacitor 76 and the resistor 77, by the charge discharged from said capacitor 76 and supplied to the base of said transistor. Therefore, the transistor 83 of the AND-circuit 80 is deenergized and the contact 86 of the relay circuit 84 is closed, allowing the current to flow through the solenoid 42 of the three-way solenoid valve means 29. The operations of the three-way solenoid valve means 29 and the brake pressure governor means 8, subsequent to the energization of the solenoid 42, are as previously described and by the operations of these means the brake pressure exerted on the wheel 1 is forcibly relieved to facilitate the rotation of the wheel 1.

Here, it should be obvious from the foregoing description that the condition of the wheel speed, being below a predetermined value as referred to in the present invention, includes the case wherein the wheel speed is zero, namely the condition of the wheel 1 having stopped its rotation.

The fact that the wheels 1 have stopped rotating at a peripheral speed deceleration of greater than the predetermined value, upon application of a braking force, means either the vehicle has been brought to a halt or the wheels are skidding. A skid condition means that the wheels begin to skid (or the wheels are locked) upon application of brake, and this is largely influenced by the condition of the surface on which the vehicle is moving and the weight of the vehicle. The condition under which the vehicle can be brought to a halt without encountering skid conditions, can be represented by the following expression:

(vehicle weight) $x$ (coefficient of friction between road surface and the wheel 1) > braking force In the above inequality, the coefficient of friction naturally has an influential factor effecting the surface condition of the road on which the vehicle is travelling and the surface condition of the wheels 1. It will, therefore, be seen that by regulating the brake pressure upon detecting the condition tending to induce skidding due to locking of the wheels 1, namely the condition tending to realize a relation reverse to the above inequality due to an excessively large braking force, as in the system of the present invention, it is possible to regulate the braking force according to the road surface conditions.

It should be understood that the present invention is not restricted only to the embodiment described and illustrated herein, but many modifications can be made to the details of the system, in materializing the present system, and any and all modes of practice which do not deviate from the principle of the invention are included within the scope of the invention. For instance, use of a combined circuit consisting of a DC generator, a pulse generator and a D-A conversion circuit, in lieu of the generator circuit 50; use of the propeller shaft, the rotary shaft of the transmission or the wheel axis as means for driving said generators; use of the Schmitt circuit or a differential amplifier as the wheel speed detector 60; use of a flywheel as the sudden wheel deceleration detector, for mechanically detecting a sudden deceleration of the wheel 1; use of a circuit arrangement other than that employed in the embodiment described herein, for effecting charging and discharging of the capacitors therethrough; use of transistors only or diodes only as the AND-circuit 80 and use of a hydraulically, electromagnetically or mechanically operative pressure regulating mechanism depending upon the type of the braking system of the vehicle to which the present invention is applied being pneumatic, electromagnetic or mechanical, are possible within the scope of the invention.

What is claimed is:

1. An automatic antiskid braking system for use with a vehicle having wheels and brakes said system comprising:
   an AC generator for generating an AC voltage proportional to wheel speed;
   vehicle speed voltage generating means for generating a DC voltage proportional to vehicle speed by rectifying and smoothing the AC voltage;
   deceleration detecting circuit means connected to said vehicle speed voltage generating means for differentiating the DC voltage and for storing a voltage corresponding to a deceleration higher than a predetermined value for a given period of time when such a deceleration is detected and for providing an output signal in response thereto, means for detecting a predetermined vehicle speed including a resistive voltage divider circuit, connected to said vehicle speed voltage generating means and for providing an output signal in response thereto, and an AND-circuit connected to receive the output signals from said deceleration detecting circuit means and from said means for detecting a predetermined vehicle speed for adding together these outputs to control a switching which, in turn, actuates a braking force releasing means whereby the vehicle brakes are automatically released only when both these outputs are present.

2. An automatic antiskid braking system as in claim 1 wherein said deceleration detecting means comprises:

a differentiation circuit including a capacitor and resistor connected to a control electrode of an active element, and a storage circuit including a series diode and capacitor circuit connected to a controlled electrode of said active element and a further active element having a control electrode connected to the capacitor of said series diode and capacitor circuit, said further active element being controlled by stored voltage from said differentiation circuit to produce an output signal therefrom when deceleration higher than said predetermined value for said given period of time is detected.

3. An automatic antiskid braking system as in claim 1 wherein said means for detecting a predetermined vehicle speed comprises:

a resistive voltage divider having two ends connected across said DC voltage from the vehicle speed voltage generating means and a top voltage terminal, and an active element having a control electrode connected to effect control of said active element by the voltage on said top voltage terminal and thereby provide an output signal when said predetermined vehicle speed is detected.

* * * * *